A. J. ENGLISH.
VALVE.
APPLICATION FILED SEPT. 26, 1918.

1,427,680.

Patented Aug. 29, 1922.

INVENTOR.
Andrew J. English
by John W. Stredei
ATTORNEY.

UNITED STATES PATENT OFFICE.

ANDREW J. ENGLISH, OF CINCINNATI, OHIO, ASSIGNOR TO GEORGE J. UCKOTTER, OF CINCINNATI, OHIO.

VALVE.

1,427,680.  Specification of Letters Patent.  Patented Aug. 29, 1922.

Application filed September 26, 1918. Serial No. 255,868.

*To all whom it may concern:*

Be it known that ANDREW J. ENGLISH, a citizen of the United States, residing at the city of Cincinnati, in the county of Hamilton and State of Ohio, has invented certain new and useful Improvements in Valves, of which the following is a specification.

The object of my invention is to provide a valve or valve seat which will expand or contract under use to which it is subjected, so as to be self compensating and thus always be of the proper diameter and configuration needed during the operation of the parts acting in conjunction therewith. It will also take up the wear of the parts and thus always present a desired operative form. In carrying out my invention I provide a yielding or flexible valve seat as hereinafter set forth.

In the accompanying drawing, forming part of this specification:

Figure 1:
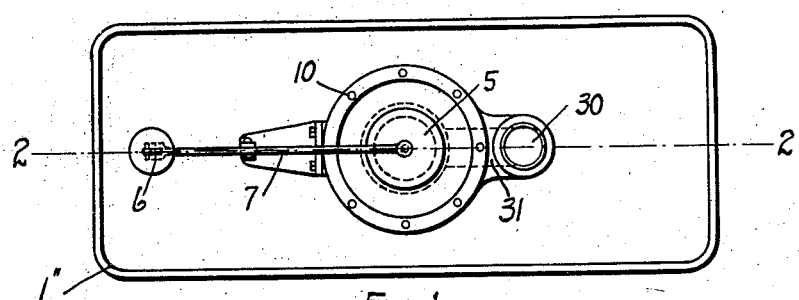
Fig. 1, is a plan view taken on line 1—1 of Fig. 2.
Figure 2:
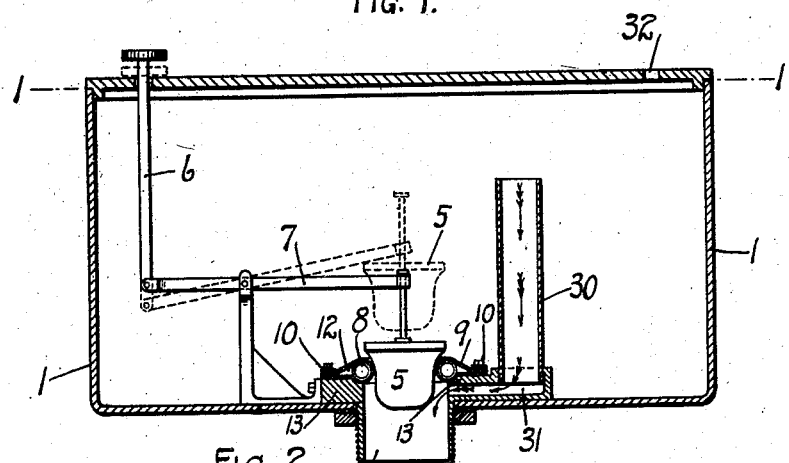
Fig. 2, is a sectional view taken on the line 2—2 of Fig. 1.
Figure 3:
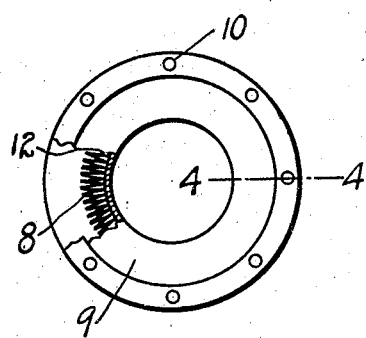
Fig. 3, is a plan of the valve seat partly broken away to show the spring.
Figure 4:
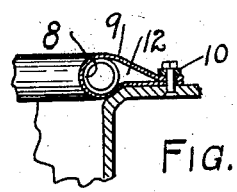
Fig. 4, is a sectional view on line 4—4 of Fig. 3.

In Figs. 1, 2, 3 and 4, I illustrate the invention as applied to a toilet flush tank.

In the drawings, the flush tank is marked 1 and at its bottom I provide the usual outlet pipe 2, of any suitable form, and provide at its inner extremity a holding flange 13. I provide a float valve 5, preferably formed as shown, however, any form may be used which is found desirable. I provide a usual form of plunger 6 suitably supported in the tank 1 and connect a lever 7 between it and the float valve 5, by means of which it is raised off its seat and as the water recedes in tank 1, the suction draws the valve 5 back down upon its seat.

The float valve seats on a flexible, yielding and compensating valve seat, which is the main feature of my invention.

I will describe one form of making and using the same in connection with a flush tank apparatus or device. The valve seat is preferably circular, annular or like a ring in shape, but may be made of any form or shape found desirable in practice. In the present instance the valve seat is formed of a coiled spring 8, forming a ring like configuration, a flexible covering 9 encompassing said coiled spring; this flexible covering is looped over said spring and its ends or edges are connected together by screw and flange connections 10 or in any suitable manner. The looped part is full and extends out somewhat from the spring to give play to the spring when it expands or contracts and this looped part is marked 12.

This valve seat is placed loosely on top of the flange 13 of outlet pipe 2. The float valve 5 is always seated on the seat formed of ring 8 and flexible covering 9 as shown in solid lines in Fig. 2, and when the plunger 6 and lever 7 are operated the valve 5 leaves its seat as shown in dotted lines. When the valve 5 is down it is tightly seated and when elevated remains up until the water recedes and when it has receded to a certain line the suction created in the flushing tank pulls the valve 5 down onto the seat, and when seated, the valve seat again impinges sufficiently against valve 5 to hold it on the seat, thus the expansion and contraction of the spring like ring is self compensating to always form a proper seat for the valve.

In the tank 1, I show an overflow pipe 30 connecting with a by-pass 31, so that if the inlet valve should leak, the water will overflow through pipe 30 and by-pass 31 out through pipe 2. All these parts and those which form the valve seat and connections can be loosened up by loosening up flange 13 and turned through an arc of 180 degrees and when this is done the plunger 6 will pass through hole 32 in the other side of the tank 1.

The inlet valve and connections and other parts are not shown herein, as they are not part of this invention.

Figure 5:
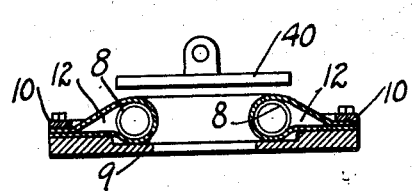
Fig. 5, is a sectional view of the valve seat and connecting parts, the valve shown in elevation, and being flat, for use with an air controlled apparatus or pump.

In Fig. 5, I show the valve seat in connection with a flat faced valve 40; this construction being suitable for use in connection with air operated valve mechanism. In this Fig. 7, the valve 40 is shown off of the valve seat but when forced or pulled down by air pressure or suction, the valve 40 will rest upon and impinge against the valve seat and form a tight juncture between valve and valve seat.

While I have described one specific form of carrying my invention into effect, it will be obvious that the same may be modified to some extent and I wish to be understood as claiming that such modifications will still fall within the scope of my invention.

What I claim as new and my invention and desire to secure by Letters Patent is:

A valve seat formed of a one piece coiled spring in annular shape and capable of expanding and contracting, combined with a flexible material enveloping the same and extending materially outward therefrom to allow play for the spring.

In testimony whereof I affix my signature.

ANDREW J. ENGLISH.